United States Patent [19]

Bruzzone

[11] Patent Number: 4,719,983
[45] Date of Patent: Jan. 19, 1988

[54] DEVICE AND ATTENDANT EQUIPMENT FOR CONVERTING A MOTOR-SCOOTER INTO A VEHICLE SUITABLE FOR OPERATING ON SNOWY GROUND

[76] Inventor: Riccardo Bruzzone, Viale Des Geneys 29A/4, 16148 Genova, Italy

[21] Appl. No.: 938,802

[22] Filed: Dec. 8, 1986

[51] Int. Cl.⁴ .............................. B62M 27/02
[52] U.S. Cl. .................... 180/184; 180/198; 180/183; 180/185; 180/190
[58] Field of Search .............. 180/198, 184, 182, 183, 180/185, 186, 190

[56] References Cited

U.S. PATENT DOCUMENTS

| | | | |
|---|---|---|---|
| 3,336,994 | 8/1967 | Pedersen | 180/185 |
| 4,069,882 | 1/1978 | Leonard et al. | 180/190 |
| 4,534,437 | 8/1985 | Howerton et al. | 180/198 |
| 4,613,006 | 9/1986 | Moss et al. | 180/190 |

Primary Examiner—John J. Love
Assistant Examiner—Donn McGiehan
Attorney, Agent, or Firm—Jacobs & Jacobs

[57] ABSTRACT

A device comprising a rear adapter frame with an idle crawler track and adapted to be mounted, together with a front steering skid, in lieu of the rear and front wheels, respectively, of a motor-scooter so as to enable a quick conversion thereof, when desired, into a vehicle suitable to travel on snowy ground.

4 Claims, 5 Drawing Figures

DEVICE AND ATTENDANT EQUIPMENT FOR CONVERTING A MOTOR-SCOOTER INTO A VEHICLE SUITABLE FOR OPERATING ON SNOWY GROUND

BACKGROUND OF THE INVENTION

In the field of motor vehicles suitable for operating with no difficulty on snowy ground, vehicles are being used which have been manufactured for this purpose, such as motor-sleighs and snow-carts. Due to their constructional characteristics, these vehicles may only operate on the snow and, therefore, are to be considered (due also to their high cost) as professional vehicles requiring trolleys or other transport trucks when they are to travel on a road. Moreover, these vehicles, due to their central wide crawler track or side crawler tracks rigidly connected to the body of the vehicle, may operate on a transversely or sideways sloping ground only within very narrow angles of inclination which, when exceeded, entail inevitably the risk of overturning. In an attempt to overcome said disadvantages, at least partly, a two-wheeled crawler-tracked vehicle for off-road use is presently being marketed. This vehicle may be adapted, when desired, to the requirements of the operation on the snow by securing additional grip-teeth to the relatively narrow crawler track, but this makeshift solution has not solved the problem entirely, with particular reference to the operation on a transversely sloping snowy ground. Therefore, we have devised a solution to meet a broader range of requirements within the limits of economy, such as to ensure the desired diffusion of the article of the invention.

SUMMARY OF THE INVENTION

This invention relates to a device with attendant equipment for converting a motor-scooter into a vehicle suitable for operating on snowy ground, yet with no modification of any essential characteristic of said motor-scooter so that, after using this vehicle on the snow, it can be readily turned back into its original operative conditions.

The motor-scooter has been considered as the most suitable basic vehicle, due to its present high degree of perfection and reliability assuring practical adaptation advantages. In fact, mainly by virtue of the cantilever mounting of its wheels by means of bolts (i.e. not straddled by a fork), just like motor-car wheels, it lends itself for the kind of conversion which has been devised now by this invention. Substantially, the device of the invention comprises an adapter frame including an idler crawler track, a drum-like hub containing a reducing and reversing gearing to be fitted in lieu of the original one that mounts the rear wheel of the motor-scooter, a driving toothed wheel to be fitted in lieu of said rear wheel and designed—according to one of the main features of this system—to actuate the crawler track by meshing with the outer side thereof, instead of the inner side as usual, thus permitting the crawler track a certain freedom of inclination, the assembly comprising, finally, a steering skid to be mounted in lieu of the front wheel and constructed as described in detail hereinafter.

BRIEF DESCRIPTION OF THE DRAWINGS

A preferred embodiment of the invention is shown by way of non-limiting example in the accompanying drawings, wherein.

DESCRIPTION OF THE PREFERRED EMBODIMENT

Figure 1:
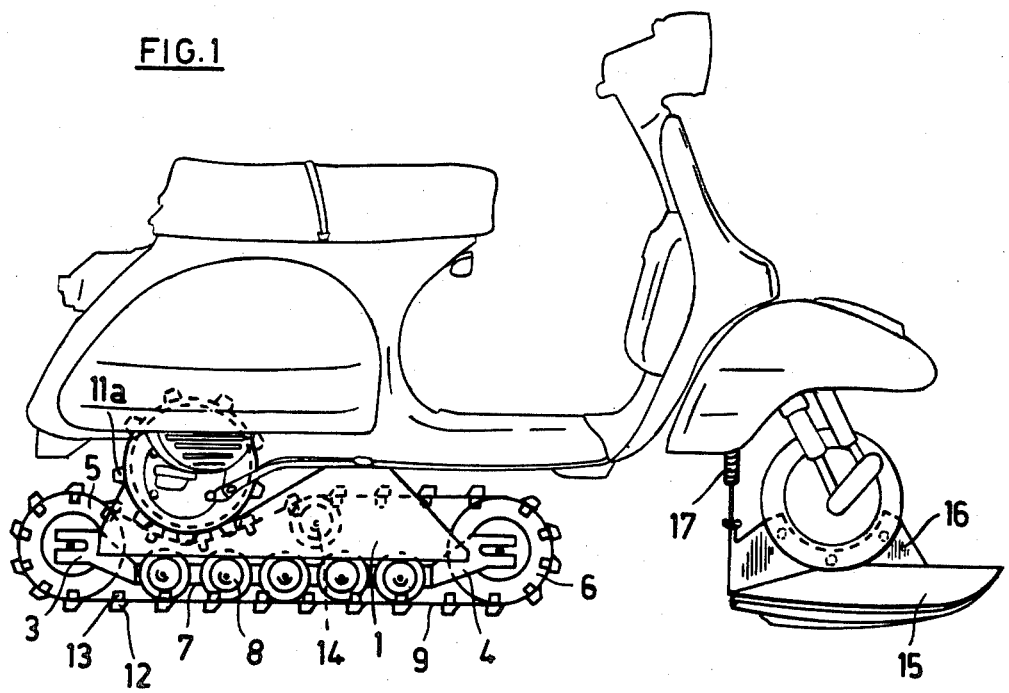
FIG. 1 is a general side view of a motor-scooter mounting having in lieu of the usual wheels, a rear crawler device and a front steering skid.
Figure 2:
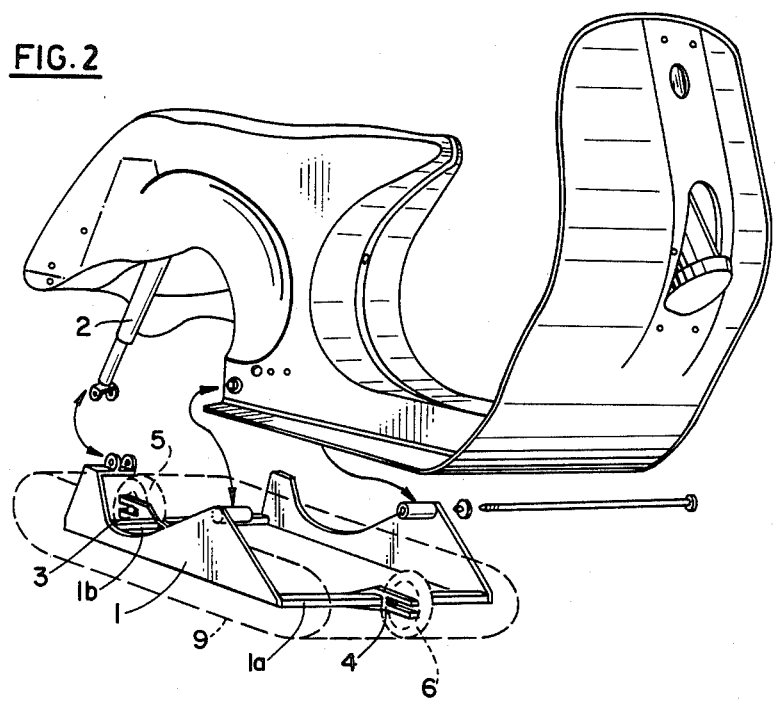
FIG. 2 is a diagrammatic, fragmentary, perspective view of the body of a scooter and crawler-mounting frame.
Figure 3:
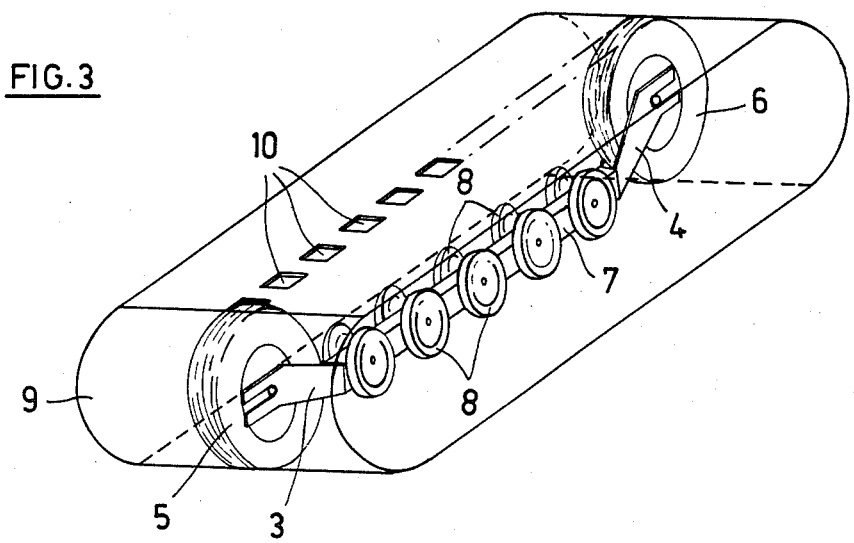
FIG. 3 is a diagrammatic perspective view of the swingable crawler-guiding system.
Figure 4:
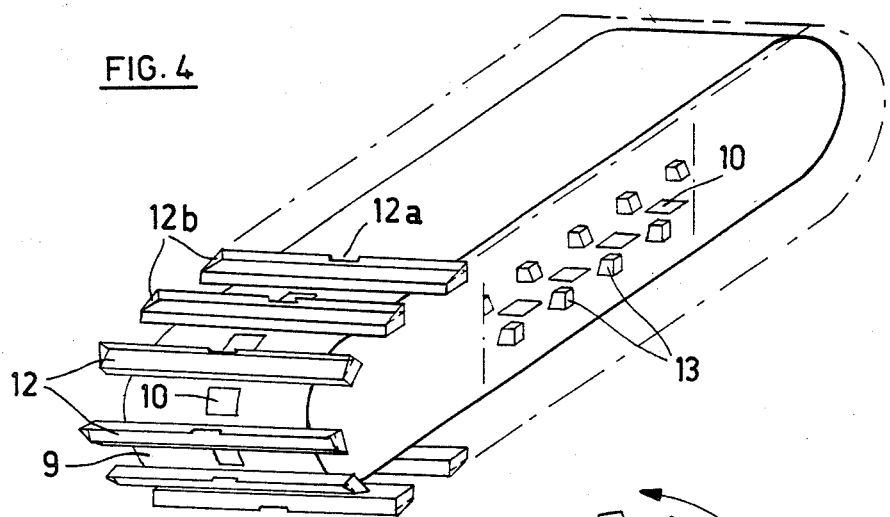
FIG. 4 is a diagrammatic perspective view of the crawler track, with its inner guide-blocks and outer gripping shoes.
Figure 5:
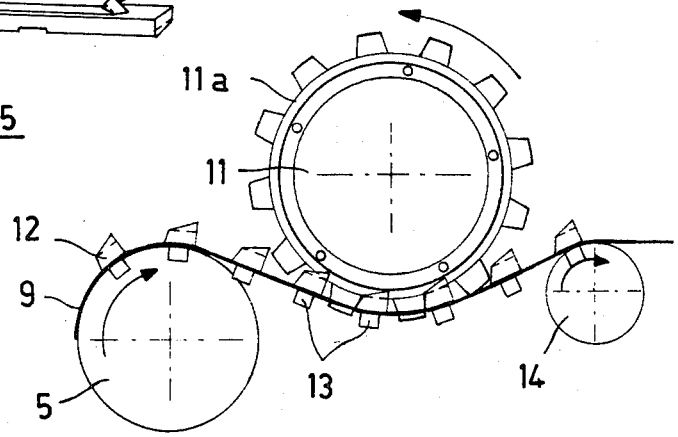
FIG. 5 is a diagrammatic, fragmentary side view of the actuating system for the crawler track through an outer toothed wheel.

As clearly shown in the Figures of the drawings, the device of the invention substantially comprises a rear crawler-mounting trolley with attendant reversing/reducing gearing arranged in lieu of the rear wheel and a steering skid arranged in lieu of the front wheel of a motor-scooter. The rear trolley comprises a cradle-like frame 1 designed for quick connection to the scooter by using the fixing means of the engine (not shown) and of the rear shock absorber 2, so as to maintain the original springing system of the vehicle. Secured centrally on two transverse spacer bars 1a–1b, are two forks 3 and 4 adapted each to mount an idle crawler-guiding wheel 5 and 6. Swingably supported between said two forks is a longitudinal bar 7 mounting at both sides thereof a number of pairs of smaller wheels 8 operating as rollers to support the weight of the scooter (the latter being shown diagrammatically for indicative purposes in FIG. 1). The crawler track (see FIG. 4) is formed by a ring-like flat belt 9 made of rubberized fabric or other suitable material. Said belt is provided with a central continuous row of equally-spaced punched openings 10 so sized and spaced apart as to correspond to the toothing formation of the driving crawler wheel 11 comprised in the reducing/reversing gearing and substituted for the rear wheel of the vehicle, as described hereinafter. Fixed to the belt 9, between each pair of openings 10, are gripping cross members or shoes 12 made of metal angle bars which are formed centrally, at the area to be engaged by the teeth of the driving crawler wheel 11, with a short depressed portion 12a which will facilitate the operational co-operation with said crawler wheel 11. As best shown in FIG. 5, said wheel, which is mounted on a suitable drum hub containing the reversing/reducing gearing (not shown) to be mounted with no special operations in lieu of the original drum hub, comprises a metal rim having firmly secured thereto a toothed ring 11a made of super-polyamide or other similar material capable of withstanding the operational stress of the toothed wheel 11 and meshing with said belt/crawler track on the outer side thereof, i.e. oppositely to the usual meshing on the inner side, and this is a basic characteristic of this invention. Said shoes 12 protrude slightly from both sides of the crawler track, so that the latter has almost the same width as the scooter. In order to obtain a perfect guidance of the track sideways, pairs of blocks 13 made of rubber or metal channel are secured to the inner side of said track in registry with the back side of said shoes 12, so that the wheels 5, 6 and 8 may roll therebetween. In order to increase the efficiency, it is to be noted that said shoes 12 may be folded over at the ends thereof so as to form transverse gripping teeth 12b assuring an improved directional stability and lateral stability when the vehicle operates on a sideways sloping ground. Moreover, in order to obtain a correct tensioning and improved operation of the crawler track, a roller 14 is provided to act as a belt stretcher and, above all, to guide said track so that the latter forms a wider angle of mesh with the toothed wheel 11.

The basic characteristic of the device described above is that, by virtue of the swingable mounting of the supporting bar 7 with its plurality of pairs of wheels 8, the crawler track 9 may become inclined with respect to the perpendicular plane of the scooter, so that the latter may proceed in a correct vertical attitude even if the ground is a transversely sloping surface.

As to the front steering skid 15, it will be noted that it comprises a single ski-like member including a guiding "bottom" with an integral upright plate member 16 so arranged as to permit the assembly to be secured in lieu of the front wheel of the scooter by means of the existing securing bolts. The skid comprises, finally, a spring-loaded stabilizing tierod 17 so constructed as to be connectible to the bolts for fixing the mudguard to the vehicle, so that said skid will be at all times in the correct operative position.

I claim:

1. A device and attendant equipment for converting a motor scooter having a rear wheel and a front wheel into a vehicle suitable for operating in any direction and without altered center of gravity substantially comprising a rear crawler-mounting trolley with its drive reversing/reducing gearing mounted in lieu of the rear wheel and a steering skid mounted in lieu of the front wheel, said trolley comprising a cradle-like frame connectible to the normal fixing means of the existing engine and shock absorber of the scooter, said frame including two transverse spacer bars supporting a front fork and a rear fork, for mounting two idle wheels capable of movably guiding said crawler track while permitting limited lateral tiltability thereof and for swingably supporting a longitudinal bar mounting a plurality of pairs of smaller supporting wheels, said crawler track having a flat belt of rubberized fabric or the like and having affixed thereto a plurality of equally-spaced cross members or shoes made of metal angle bars, and provided with a central row of rectangular openings formed with a suitable pitch therebetween in the spaces between consecutive shoes to permit meshing engagement, on the outer side of said track, of a driving toothed wheel mounted on a suitable drum hub containing a crown-and-pinion reversing/reducing gearing to be mounted in lieu of the drum hub carrying the rear wheel of the vehicle.

2. A device according to claim 1, wherein the crawler track proper, mounted on a pair of idle wheels, is driven by a toothed wheel arranged exteriorly of the ring-like crawler track, and not interiorly thereof, so that said crawler track is allowed to become inclined, within certain limits, to the vertical plane of the vehicle, and wherein said exterior driving wheel is mounted on a drum hub which is arranged in lieu of the original hub for the rear wheel and has a reduced and reversed rotary motion.

3. A device according to claim 1, wherein pairs of blocks are arranged on the inner side of the crawler track in registry with the back side of said shoes, to enable transverse guidance of said crawler track.

4. A device according to claim 1, which further comprises a steering skid mounted in lieu of the front wheel, said skid comprising a ski-like member including a guiding bottom portion, a pependicular attachment plate and a spring-loaded stabilizing tierod.

* * * * *